United States Patent
Kaigawa

(10) Patent No.: US 9,021,145 B2
(45) Date of Patent: Apr. 28, 2015

(54) FUNCTION EXECUTING APPARATUS, NON-TRANSITORY STORAGE MEDIUM STORING INSTRUCTIONS EXECUTABLE BY THE FUNCTION EXECUTING APPARATUS, AND METHOD OF CONTROLLING THE FUNCTION EXECUTING APPARATUS

(71) Applicant: Shinsuke Kaigawa, Kitanagoya (JP)

(72) Inventor: Shinsuke Kaigawa, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/221,507

(22) Filed: Mar. 21, 2014

(65) Prior Publication Data

US 2014/0297892 A1    Oct. 2, 2014

(30) Foreign Application Priority Data

Mar. 29, 2013   (JP) ................................. 2013-072368

(51) Int. Cl.
| | | |
|---|---|---|
| *G06F 3/00* | (2006.01) | |
| *G06F 3/12* | (2006.01) | |
| *G06F 1/32* | (2006.01) | |

(52) U.S. Cl.
CPC ............ *G06F 3/1259* (2013.01); *G06F 3/1206* (2013.01); *G06F 3/1292* (2013.01); *G06F 3/1204* (2013.01); *G06F 3/1229* (2013.01); *G06F 3/1236* (2013.01); *G06F 1/32* (2013.01)

(58) Field of Classification Search
USPC .......................................................... 710/5
See application file for complete search history.

(56) References Cited

U.S. PATENT DOCUMENTS

| | | | |
|---|---|---|---|
| 2003/0179244 A1* | 9/2003 | Erlingsson ................... 345/788 |
| 2008/0074713 A1 | 3/2008 | Nakawaki | |
| 2009/0207437 A1 | 8/2009 | Tajima | |

FOREIGN PATENT DOCUMENTS

| | | |
|---|---|---|
| JP | 2004-090243 A | 3/2004 |
| JP | 2008-079151 A | 4/2008 |
| JP | 2012-173602 A | 9/2012 |

OTHER PUBLICATIONS

Extended European Search Report dated Jun. 23, 2014 from related EP 14162084.9.

* cited by examiner

*Primary Examiner* — Farley Abad
(74) *Attorney, Agent, or Firm* — Scully, Scott, Murphy & Presser, PC

(57) ABSTRACT

A function executing apparatus includes: a communication device which communicates with an external device; a function executing device which executes at least one preset function; and a controller. The controller determines whether the communication device can communicate with the external device. When the communication device can communicate with the external device, the controller executes a running-state determination processing for determining whether an application program corresponding to a certain function to be executed by the function executing device is running on the external device. When the application program corresponding to the certain function is running, the controller controls the function executing device to execute the certain function. When the application program corresponding to the certain function is not running, the controller executes an activation command processing for transmitting an activation command for activating the application program corresponding to the certain function, to the external device.

15 Claims, 5 Drawing Sheets

FUNCTION EXECUTING APPARATUS, NON-TRANSITORY STORAGE MEDIUM STORING INSTRUCTIONS EXECUTABLE BY THE FUNCTION EXECUTING APPARATUS, AND METHOD OF CONTROLLING THE FUNCTION EXECUTING APPARATUS

CROSS REFERENCE TO RELATED APPLICATION

The present application claims priority from Japanese Patent Application No. 2013-072368, which was filed on Mar. 29, 2013, the disclosure of which is herein incorporated by reference in its entirety.

BACKGROUND OF THE INVENTION

1. Field of the Invention

The present invention relates to a function executing apparatus, a non-transitory storage medium storing instructions readable and executable by the function executing apparatus, and a method of controlling the function executing apparatus.

2. Description of the Related Art

There is known an image forming system constituted by: a host computer configured to create print data; and a printer coupled to the host computer and configured to perform printing based on the print data created by the host computer. Also, there is known a technique in which the printer switches its power save mode between an OFF state and an ON state according to whether application software registered with the host computer is running or not. Specifically, a printer driver is installed on the host computer, and the printer driver determines whether the application software is running or not. The printer driver outputs a command to the printer according to whether the application software is running or not. The printer switches the power save mode between the OFF state and the ON state according to the command received from the printer driver.

SUMMARY OF THE INVENTION

In the above-described technique, however, the printer driver uniformly performs the above-described determination for a plurality of types of application software registered with the host computer and outputs a command when at least one of the plurality of types of application software is running. Accordingly, the printer cannot recognize which application software is running.

This invention has been developed to provide: a function executing apparatus capable of performing appropriate control according to a running state of a specific application program on a device as a communication partner; a non-transitory storage medium storing instructions readable and executable by the function executing apparatus; and a method of controlling the function executing apparatus.

The present invention provides A function executing apparatus including: a communication device configured to communicate with an external device; a function executing device configured to execute at least one preset function; a processor; and a memory configured to store instructions which, when executed by the processor, cause the function executing device to: determine whether communication of the communication device with the external device is possible; execute a running-state determination processing in which the processor determines whether an application program corresponding to a certain function of the at least one preset function to be executed by the function executing device is running on the external device, when the processor determines that the communication of the communication device with the external device is possible; control the function executing device to execute the certain function, when the processor in the running-state determination processing determines that the application program corresponding to the certain function is running; and execute an activation command processing in which the processor transmits an activation command for activating the application program corresponding to the certain function, to the external device, when the processor in the running-state determination processing determines that the application program corresponding to the certain function is not running.

The present invention also provides a non-transitory storage medium storing instructions readable and executable by a function executing apparatus, the function executing apparatus including: a communication device configured to communicate with an external device; a processor; and a function executing device configured to execute at least one preset function; the instructions, when executed by the processor, causing the function executing device to: determine whether communication of the communication device with the external device is possible; execute a running-state determination processing in which the processor determines whether an application program corresponding to a certain function of the at least one preset function to be executed by the function executing device is running on the external device, when the processor determines that the communication of the communication device with the external device is possible; control the function executing device to execute the certain function, when the processor in the running-state determination processing determines that the application program corresponding to the certain function is running; and execute an activation command processing in which the processor transmits an activation command for activating the application program corresponding to the certain function, to the external device, when the processor in the running-state determination processing determines that the application program corresponding to the certain function is not running.

The present invention also provides a method of controlling a function executing apparatus, the function executing apparatus including: a communication device configured to communicate with an external device; a function executing device configured to execute at least one preset function; and a processor; the method causing the function executing device to: determine whether communication of the communication device with the external device is possible; execute a running-state determination processing in which the processor determines whether an application program corresponding to a certain function of the at least one preset function to be executed by the function executing device is running on the external device, when the processor determines that the communication of the communication device with the external device is possible; control the function executing device to execute the certain function, when the processor in the running-state determination processing determines that the application program corresponding to the certain function is running; and execute an activation command processing in which the processor transmits an activation command for activating the application program corresponding to the certain function, to the external device, when the processor in the running-state determination processing determines that the application program corresponding to the certain function is not running.

It is noted that the present invention may be embodied in various forms such as a control device configured to control the function executing apparatus, a function executing system, a function executing method, a function executing program for controlling the function executing apparatus, and a storage medium for storing the function executing program.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF THE EMBODIMENT

Figure 1:
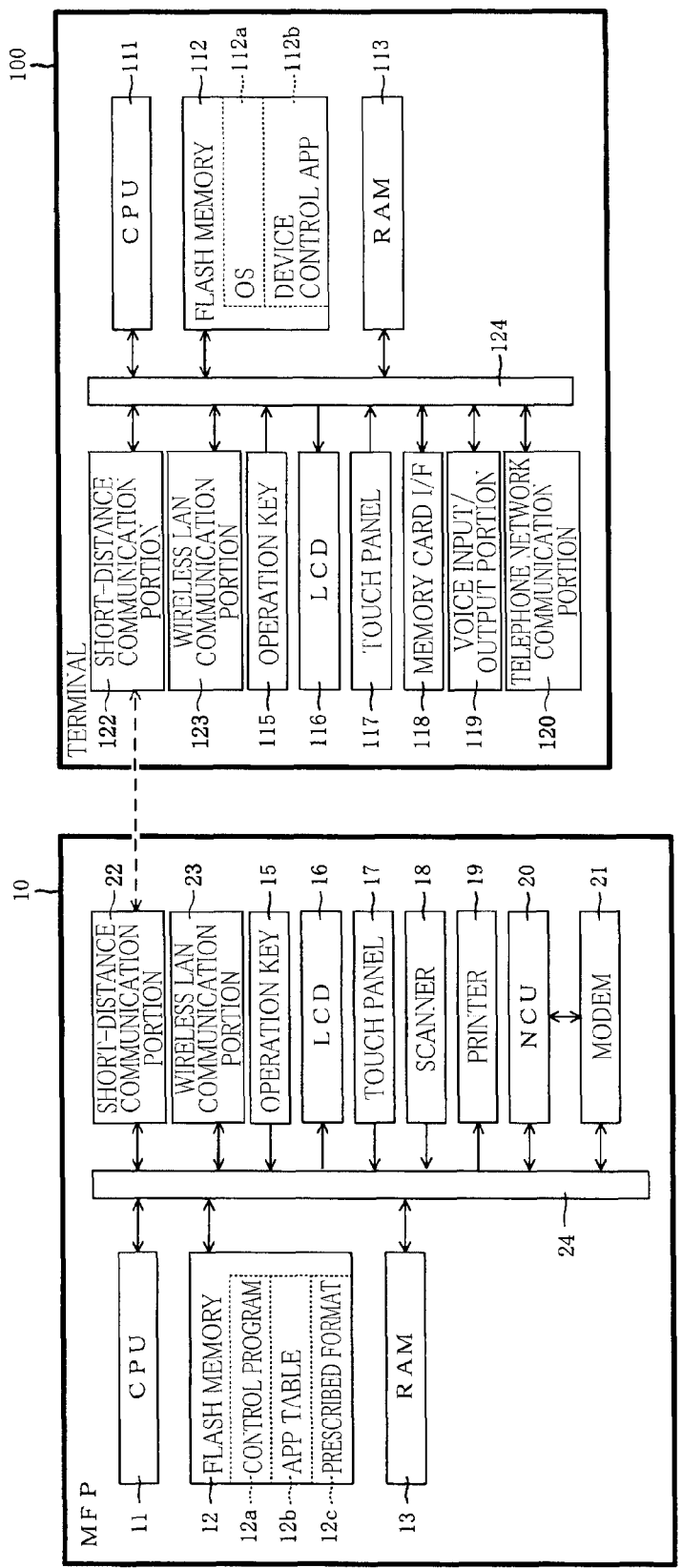
FIG. 1 is a block diagram illustrating electric configurations of a multi-function peripheral and a terminal.

Hereinafter, there will be described one embodiment of the present invention by reference to the drawings. FIG. 1 is a block diagram illustrating electric configurations of: a multi-function peripheral (MFP) 10 as one example a function executing apparatus according to one embodiment of the present invention; and a terminal (i.e., a terminal device) 100 communicable with the MFP 10. The MFP 10 has various functions such as a printing function, a scanning function, a facsimile function, and a copying function. In the present embodiment, the MFP 10 can execute appropriate control according to a running state of a specific application program (hereinafter may be simply referred to as "application") stored in the terminal 100.

The MFP 10 mainly includes a CPU 11, a flash memory 12, a RAM 13, operation keys 15, an LCD 16, a touch panel 17, a scanner 18, a printer 19, a network control unit (NCU) 20, a modem 21, a short-distance communication portion 22, and a wireless LAN communication portion 23. The devices 11-13 and 15-23 are connected to each other via an input/output port 24. The CPU 11 controls various functions of the MFP 10 and the devices connected to the input/output port 24, according to fixed values and programs stored in the flash memory 12 and data stored in the RAM 13, or various signals transferred via the NCU 20.

The flash memory 12 is a non-transitory memory which stores, e.g., a control program 12a for controlling operations of the MFP 10. Processings in the flow charts in FIGS. 2-4 which will be described below are executed by the CPU 11 according to the control program 12a. The control program 12a in the present embodiment includes an application program and a protocol stack. The application program is a program which causes the CPU 11 to execute processings in the application layer in the OSI model. The protocol stack includes a P2P program, an R/W program, and a CE program. The P2P program is for executing processings in a P2P (peer-to-peer) mode according to the NFC (Near Field Communication) standard. The R/W program is for executing processings in a Reader/Writer mode according to the NFC standard. The CE program is for executing processings in a CE (Card Emulation) mode according to the NFC standard. These programs are for executing processings according to the NFC standard defined in the NFC forum. It is noted that the P2P mode, the Reader/Writer mode, and the CE mode will be explained in detail later.

The flash memory 12 stores an application table 12b and a prescribed format 12c. The application table 12b stores a relationship between applications each capable of using a function of the MFP 10 and application numbers each assigned to a corresponding one of the applications. It is noted that an operating system is distributed by an organization, and each of the application numbers is an identification number which is assigned, in a market site operated by the organization, to an application that is based on the operating system. Also, the flash memory 12 stores various set values which are set for various functions of the MFP 10. The prescribed format 12c is a format which indicates an application that can be stored in the application table 12b (i.e., the application capable of using the function of the MFP 10). For example, the prescribed format 12c indicates that a header portion of data contains predetermined information (e.g., information indicating a vender of the MFP 10). It is noted that a plurality of kinds of formats are used each as the prescribed format 12c. The RAM 13 is a rewritable transitory memory having an area for temporarily storing data when the CPU 11 executes the control program 12a.

The operation keys 15 are mechanical keys provided on a housing of the MFP 10 to receive or accept input of, e.g., various set values and instructions from a user. The LCD 16 displays various screens thereon. The touch panel 17 is superposed on a screen of the LCD 16. When an input object such as a user's finger or a stylus has touched or approached the screen of the LCD 16, the touch panel 17 detects a position of the input object and transmits the detected position to the MFP 10. The scanner 18 reads a document and converts it to image data. The printer 19 prints an image on a recording sheet based on image data. The modem 21 upon facsimile transmission converts image data to be transmitted, into a signal transmittable to a telephone line network, not shown, and transmits the signal to the telephone line network via the NCU 20. Also, the modem 21 receives a signal from the telephone line network via the NCU 20 to decode the signal into image data. The NCU 20 connects between the MFP 10 and the telephone line network, not shown, and closes or disconnects the line according to a command transmitted from the modem 21 to control connection between the MFP 10 and the telephone line network.

The short-distance communication portion 22 is an interface for short-distance wireless communication having a short communicable distance or range, e.g., about 10 cm. In the present embodiment, the short-distance wireless communication performed by the short-distance communication portion 22 is contactless communication according to the NFC standard (hereinafter may be referred to as "NFC communication"). The MFP 10 is communicably connected to the terminal 100 having a short-distance communication portion 122, via the short-distance communication portion 22.

The wireless LAN communication portion 23 is an interface for wireless communication over a wireless LAN. In the present embodiment, the wireless LAN communication portion 23 is configured to perform wireless communication over a wireless LAN according to the IEEE 802.11b/g standard. In the present embodiment, the wireless LAN communication portion 23 is connected to the terminal 100 having a wireless LAN communication portion 123, through wireless communication according to Wi-Fi (R) standard (hereinafter may be referred to as "Wi-Fi communication"), in an infrastructure mode in which connection is established via an access point, not shown, as a relay device or in an ad hoc mode as direct connection.

The terminal 100 is a smartphone, for example. In the present embodiment, the terminal 100 can use the P2P mode and the R/W mode but cannot use the CE mode as the mode of the NFC communication. The terminal 100 mainly includes a CPU 111, a flash memory 112, a RAM 113, operation keys 115, an LCD 116, a touch panel 117, a memory card interface (memory card I/F) 118, a voice input/output portion 119, a telephone network communication portion 120, the short-distance communication portion 122, and the wireless LAN communication portion 123. The devices 111-113, 115-120, and 122, 123 are connected to each other via an input/output port 124. The CPU 111 controls the devices connected to the input/output port 124, according to fixed values, program, and the like stored in the flash memory 112.

The flash memory 112 is a rewritable non-transitory memory. The flash memory 112 stores an operating system (hereinafter referred to as "OS") 112a and a device control application 112b. Hereinafter, the CPU 111 which executes a program such as an application and an operating system may be referred to simply as the name of the program. For example, description "application program" or "application" may mean the CPU 111 which executes the application program in the following explanation.

The OS 112a is basic software for offering standard functions of the terminal 100, in the present embodiment, the OS 112a is Andriod™. The device control application 112b is an application program provided by a vender of a device such as the MFP 10. The device control application 112b is installed on the terminal 100 by the user, allowing the user to use or operate the MFP 10 from the terminal 100. For example, the device control application 112b allows the user to directly use the printing function and the scanning function of the device from the terminal 100 not via a personal computer or other similar devices. The device control application 112b is an application program based on Andriod as the OS 112a.

The operation keys 115 are mechanical keys provided on a housing of the terminal 100 to receive or accept input of, e.g., various set values and instructions from the user. The LCD 116 displays various screens thereon. The touch panel 117 is superposed on a screen of the LCD 116. When an input object such as a user's finger or a stylus has touched or approached the screen of the LCD 116, the touch panel 117 detects a position of the input object and transmits the detected position to the terminal 100. The memory card I/F 118 is an interface on which a non-transitory memory card, not shown, is mountable, and this memory card I/F 118 controls writing or reading of data in or from the memory card. The voice input/output portion 119 is a device for voice input and output which is constituted by a microphone, a speaker, and other similar devices. The telephone network communication portion 120 is a circuit for conversation over a mobile phone network, not shown. The short-distance communication portion 122 is an interface for short-distance wireless communication like the short-distance communication portion 22. The wireless LAN communication portion 123 is an interface for a wireless LAN like the wireless LAN communication portion 23.

Here, there will be explained modes which can be used in a case where short-distance wireless communication is NFC communication (i.e., short-distance wireless communication according to the NFC standard). Hereinafter, a device capable of performing the NFC communication such as the MFP 10 and the terminal 100 will be referred to as "NFC device".

Also, combination of the Reader mode and the Writer mode may be hereinafter referred to as "R/W mode".

The P2P mode is a mode for two-way communication between a pair of NFC devices. For example, in a case where both of a first NFC device and a second NFC device are in the P2P mode (in other words, the P2P mode is established in the first NFC device and the second NFC device), a communication link corresponding to the P2P mode (hereinafter may be referred to as "P2P communication link") is established between the first NFC device and the second NFC device. In this case, for example, the first NFC device uses the P2P communication link to transmit first data to the second NFC device. The second NFC device then uses the same P2P communication link to transmit second data to the first NFC device. The two-way communication is performed in this manner.

Each of the R/W mode and the CE mode is a mode for performing one-way communication between the pair of NFC devices. The CE mode is a mode in which an NFC device operates as a "card" which is a form defined in the NFC forum. The Reader mode is a mode for reading data from an NFC device operating as a card in the CE mode. The Writer mode is a mode for writing data into an NFC device operating as a card in the CE mode.

For example, in a case where the first NFC device is in the Reader mode, and the second NFC device is in the CE mode, a communication link corresponding to the Reader mode and the CE mode is established between the first NFC device and the second NFC device. In this case, the first NFC device uses the established communication link to receive data from the second NFC device by reading the data from an emulated card in the second NFC device.

On the other hand, for example, in a case where the first NFC device is in the Writer mode, and the second NFC device is in the CE mode, a communication link corresponding to the Writer mode and the CE mode is established between the first NFC device and the second NFC device. In this case, the first NFC device uses the established communication link to transmit data to the second NFC device by writing the data into an emulated card in the second NFC device.

In view of the above, combinations of the modes for NFC communication between a pair of NFC devices have five patterns: the P2P mode and the P2P mode; the Reader mode and the CE mode; the Writer mode and the CE mode; the CE mode and the Reader mode; and the CE mode and the Writer mode. It is noted that there is no combination of the Reader mode and the Writer mode. That is, when one NFC device is in the Reader mode, another NFC device stops the Writer mode. When one NFC device is in the Writer mode, on the other hand, another NFC device stops the Reader mode.

The NFC devices can establish a communication link corresponding to modes in which the NFC devices are operating but cannot establish a communication link corresponding to modes in which the NFC devices are not operating. For example, in a case where the MFP 10 is in the P2P mode and not in other modes (e.g., the R/W mode and the CE mode), the MFP 10 can establish a P2P communication link but cannot establish communication links in other modes.

Figure 2:
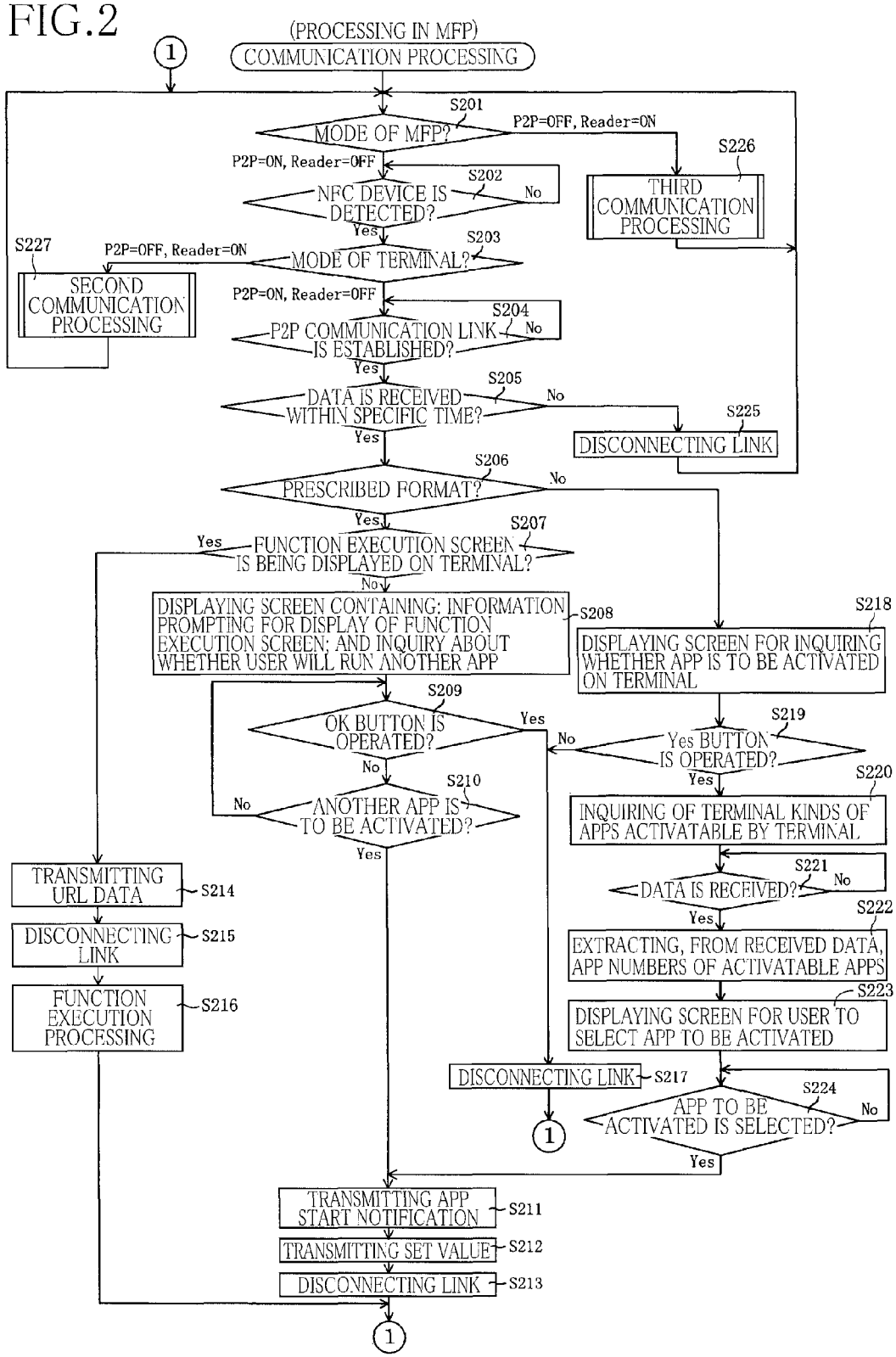
FIG. 2 is a flow chart illustrating a communication processing.

FIG. 2 is a flow chart illustrating a communication processing. This communication processing is executed by the CPU 11 according to the control program 12a and is executed in communication in a case where the terminal 100 (i.e., the NFC device) uses the function of the MFP 10. This communication processing is executed in a state in which the MFP 10 can accept or receive input over the NFC communication via the short-distance communication portion 22, and this communication processing starts upon establishment of this state.

It is noted that, in the case where the state in which the MFP 10 can receive the input over the NFC communication is established, the mode of the NFC communication is not set at the CE mode in this communication processing. Hereinafter, the wording "mode" means the mode of the NFC communication.

This flow begins with S201 at which the CPU 11 judges the mode of the MFP 10. When the CPU 11 determines that the MFP 10 is in the Reader mode (S201: P2P=OFF, Reader=ON), the CPU 11 at S226 executes a third communication processing which will be described later with reference to FIG. 4, and this flow returns to S201.

On the other hand, when the CPU 11 determines that the MFP 10 is in the P2P mode (S201: P2P=ON, Reader=OFF), the CPU 11 at S202 determines whether the MFP 10 has detected the terminal 100 as the NFC device or not. When the CPU 11 determines that the MFP 10 has not detected the terminal 100 (S202: No), the CPU 11 waits for the terminal 100 to be detected.

When the CPU 11 determines that the MFP 10 has detected the terminal 100 (S202: Yes), the CPU 11 at S203 judges the mode of the terminal 100. At S203, the CPU 11 sends the terminal 100 an inquiry signal for inquiring the mode of the NFC communication and, based on a response to the inquiry signal, judges the mode of the NFC communication which is set in the terminal 100. When the CPU 11 at S203 determines that the terminal 100 is in the Reader mode (S203: P2P=OFF, Reader=ON), the CPU 11 at S227 executes a second communication processing which will be described later with reference to FIG. 3, and this flow returns to S201.

On the other hand, when the CPU 11 determines that the terminal 100 is in the P2P mode (S203: P2P=ON, Reader=OFF), this flow goes to S204. Accordingly, processings at S204-S225 are executed in the case where both of the MFP 10 and the terminal 100 are in the P2P mode.

The CPU 11 at S204 monitors establishment of the P2P communication link (S204: No). When the CPU 11 determines that the P2P communication link has been established (S204: Yes), this flow goes to S205. Specifically, when the MFP 10 is performing an operation (hereinafter referred to as "Poll operation") for transmitting a polling signal and receiving a response signal which is a response to the polling signal, the CPU 11 sends a communication partner an Activation command corresponding to the P2P mode, and when the MFP 10 receives an OK command from the communication partner, the CPU 11 determines that the P2P communication link has been established. On the other hand, in a case where the MFP 10 is performing an operation (hereinafter referred to as "Listen operation") for receiving a polling signal and transmitting a response signal which is a response to the polling signal, when the CPU 11 has received an Activation command corresponding to the P2P mode from the communication partner and has transmitted the OK command to the communication partner, the CPU 11 determines that the P2P communication link has been established. When the P2P communication link is established, the CPU 11 controls the short-distance communication portion 22 to use the communication link to perform two-way communication with the terminal 100 as the communication partner.

When the CPU 11 has not received data from the terminal 100 via the short-distance communication portion 22 within a specific length of time (e.g., five seconds) after the P2P communication link is established (S205: No), the CPU 11 at S225 disconnects the P2P communication link, and this flow returns to S201. Specifically, the CPU 11 at S225 performs communication for a Deactivation command and an OK command. The NFC standard defines that a device performing the Poll operation transmits the Deactivation command (that is, a device performing the Listen operation receives the Deactivation command). Accordingly, in the case where the MFP 10 is performing the Listen operation, the CPU 11 receives the Deactivation command from the terminal 100 via the short-distance communication portion 22 and controls the short-distance communication portion 22 to send the terminal 100 the OK command in response to the Deactivation command. In the case where the MFP 10 is performing the Poll operation, on the other hand, the CPU 11 controls the short-distance communication portion 22 to transmit the Deactivation command to the terminal 100 and receives the OK command in response to the command from the terminal 100 via the short-distance communication portion 22. It is noted that in a case where the terminal 100 is moved away from the MFP 10 to an outside of the communicable range of the NFC communication before the communication for the Deactivation command and the OK command, the CPU 11 at S225 may forcibly disconnect the link without performing the communication of these commands.

On the other hand, when the CPU 11 at S205 has received data from the terminal 100 via the short-distance communication portion 22 within a specific length of time (e.g., five seconds) after the P2P communication link is established (S205: Yes), the CPU 11 at S206 refers to the prescribed format 12c to determine whether the received data is in the prescribed format or not. Specifically, the CPU 11 determines that the data is in the prescribed format, in a case where a header portion of the received data contains the predetermined information (e.g., the information indicating the vender of the MFP 10).

When the CPU 11 at S206 determines that the received data is in the prescribed format (S206: Yes), this flow goes to S207. In the present embodiment, the data in the prescribed format is data for requesting use of a function or functions executable by the MFP 10 such as the printing function and the scanning function. That is, an application which transmits the data in the prescribed format to the MFP 10 is an application program for using the function(s) of the MFP 10, i.e., the device control application 112b. Accordingly, the processing at S206 in the present embodiment is a processing in which the CPU 11 determines whether the device control application 112b is running on the terminal 100 or not, and when a positive decision (YES) is made at S206, the device control application 112b is running on the terminal 100. Therefore, processings at S207-S217 are executed in a case where an application for transmitting the data in the prescribed format (in the present embodiment, the device control application 112b) is running on the terminal 100.

The CPU 11 at S207 determines whether a function execution screen is being displayed on the terminal 100 or not. When transmitting data from the short-distance communication portion 122 over the NFC communication, the terminal 100 sends the MFP 10 the data and screen information which indicates a screen being displayed on the LCD 116 of the terminal 100. The screen information may be contained in a header portion of the data received at S205 or may be separate from the data and be transmitted in association with the data. The CPU 11 at S207 determines based on the received screen information whether the screen being displayed on the LCD 16 of the terminal 100 is a screen defined as the function execution screen or not.

The function execution screen is a screen which is displayed on the LCD 16 of the terminal 100 and which is a predetermined one of a plurality of screens corresponding to a certain function or one function of at least one function of the MFP 10 which relates to the application designed to transmit the data in the prescribed format to the MFP 10, in the case where the application is running on the terminal 100. Specifically, the function execution screen is one of screens which are displayed on the LCD 116 by the terminal 100 according to the device control application 112*b*, and a screen to be displayed as the function execution screen is determined by the certain function of the at least one function to be used, to instruct execution of the function. For example, in a case where the printing function of the MFP 10 is used by the device control application 112*b*, a print preview screen corresponds to the function execution screen. Accordingly, in a case where the print preview screen is being displayed on the LCD 116 of the terminal 100, execution of the printing function of the MFP 10 is commandable. It is noted that the header portion of the data received at S205 contains information which identifies the certain function of the MFP 10 to be used.

When the CPU 11 determines that the function execution screen is being displayed on the terminal 100 (S207: Yes), the CPU 11 at S214 controls the short-distance communication portion 22 to use the P2P communication link to transmit URL data to the terminal 100. The URL data indicates a URL of data stored in the internet server provided by the vender of the MFP 10, i.e., an address of a file of data in the internet server. The internet server provided by the vender of the MFP 10 allows an external device to upload and download the data in response to a request transmitted from the external device.

Upon completion of the processing at 214, the CPU 11 at S215 disconnects the P2P communication link as in the processing at S225. When the P2P communication link is disconnected, the terminal 100 switches the connection from the NFC communication to the Wi-Fi communication and uses the wireless LAN communication portion 123 to access, via an access point, not shown, the address of the file of the data in the internet server which is indicated by the received URL data, to upload data to be processed.

Upon completion of the processing at 215, the CPU 11 at S216 executes a function execution processing. Specifically, in the function execution processing at S216, the CPU 11 first switches the communication from the NFC communication to the Wi-Fi communication and uses the wireless LAN communication portion 23 to access, via an access point, not shown, the address of the file of the data in the internet server which is indicated by the URL data transmitted to the terminal 100. The CPU 11 downloads the data to be processed which is uploaded by the terminal 100. The CPU 11 then processes the downloaded data to be processed, using the certain function of the MFP 10 which is identified by the data received at S205. For example, in a case where the data received at S205 contains information identifying use of the printing function of the MFP 10, the CPU 11 controls the printer 19 to print the data to be processed which is downloaded from the internet server. Upon completion of the processing at 216, this flow returns to S201. That is, in the present embodiment, the terminal 100 can use the certain function of the MFP 10 on condition that the function execution screen is being displayed on the LCD 116.

On the other hand, when the CPU 11 at S207 determines that the function execution screen is not being displayed on the terminal 100 (S207: No), the CPU 11 at S208 controls the LCD 16 to display a first screen 51 (see FIG. 5A) which contains: information prompting for display of the function execution screen; and inquiry about whether the user will activate another application on the terminal or not. As will be explained in detail later, the information prompting for display of the function execution screen is display for prompting the user to perform an operation for displaying the function execution screen since the LCD 116 of the terminal 100 is currently displaying a screen that differs from the function execution screen, and the functions of the MFP 10 cannot be used as described above. The display of the information contains an OK button 51*a*2 which is provided for the user to confirm the display of the function execution screen. The inquiry about whether or not the user will activate another application on the terminal is display for inquiring of the user whether or not the user will activate an application that differs from the application currently running. The display of the inquiry contains a button that can designate an application that differs from the application currently running, among the applications stored in the application table 12*b* (i.e., the applications capable of using the functions of the MFP 10).

When the MFP 10 has detected a touch operation on the OK button 51*a*2 contained in the first screen 51 and provided for the information prompting for display of the function execution screen (S209: Yes), the CPU 11 at S217 disconnects the P2P communication link as in the processing at S225, and this flow returns to S201. On the other hand, when the MFP 10 has detected a touch operation on a button contained in the first screen 51 which can designate an application that differs from the application currently running (S209: No, S210: Yes), the CPU 11 at S211 controls the short-distance communication portion 22 to use the P2P communication link to send the terminal 100 an app start notification for activating or running an application corresponding to the operated button. Specifically, the CPU 11 at S211 refers to the application table 12*b* to send the terminal 100 the application number assigned to the application corresponding to the operated button, as the app start notification. When having received the app start notification (i.e., the application number) via the short-distance communication portion 122, the terminal 100 controls the OS 112*a* to activate the application corresponding to the application number. When the MFP 10 has not detected a touch operation on any button (S210: No), this flow returns to S209.

Then, the CPU 11 at S212 reads, from the flash memory 12, a current set value set for another function of the MFP 10 which is used by the application corresponding to the application number transmitted as the app start notification, and the CPU 11 controls the short-distance communication portion 22 to use the P2P communication link to transmit the set value to the terminal 100. This operation can reflect the current set value set for said another function of the MFP 10 which is used by the application, in a set value of the application activated on the terminal 100 in response to the app start notification. Upon completion of the processing at 212, the CPU 11 at S213 disconnects the P2P communication link as in the processing at S225, and this flow returns to S201.

When the CPU 11 at S206 determines that the received data is not in the prescribed format (S206: No), this flow goes to S218. The negative decision (No) at S206 indicates that the application for transmitting data in the prescribed format (in the present embodiment, the device control application 112*b*) is not running on the terminal 100. Accordingly, processings at S218-S224 are executed in the case where the application for transmitting data in the prescribed format is not running on the terminal 100.

The CPU 11 at S218 controls the LCD 16 to display a second screen 52 (see FIG. 5B) which is a screen for inquiring of the user whether the user will activate an application on the terminal 100 or not. As will be explained in detail later, the second screen 52 contains: a Yes button 52*b* provided for the user to show his or her intention of activating the application; and a No button 52*c* provided for the user to show his or her intention of not activating the application.

When the MFP 10 has detected a touch operation on the No button 52*c* contained in the second screen 52 (S219: No), the CPU 11 at S217 disconnects the P2P communication link as in the processing at S225, and this flow returns to S201. On the other hand, when the MFP 10 has detected a touch operation on the Yes button 52b contained in the second screen 52 (S219: Yes), the CPU 11 at S220 controls the short-distance communication portion 22 to use the P2P communication link to inquire of the terminal 100 kinds of applications activatable by the terminal 100. In response to this inquiry, the terminal 100 controls the short-distance communication portion 122 to use the P2P communication link to send the MFP 10 information about the applications activatable by the terminal 100, e.g., data containing the application numbers of the applications installed on the terminal 100.

Upon completion of the processing at 220, the CPU 11 waits for the short-distance communication portion 22 to receive the data from the terminal 100 (S221: No). When the CPU 11 has received data from the terminal 100 via the short-distance communication portion 22 (S221: Yes), the CPU 11 at S222 extracts, from the received data, the application numbers of the applications activatable by the terminal 100. Then, the CPU 11 at S223 controls the LCD 16 to display a third screen 53 (see FIG. 5C) which is a screen provided for the user to select an application to be activated from among applications respectively corresponding to the extracted application numbers. As explained in detail later, the third screen 53 contains a plurality of buttons which are selected by the user to individually designate the applications extracted at S222. The user can touch a desired one of the buttons contained in the third screen 53 to select the application to be activated. It is noted that the third screen 53 preferably contains ones of the applications stored in the application table 12b, which ones are identified by data received from the terminal 100 and can be activated by the terminal 100.

Upon completion of the processing at S223, the CPU 11 waits for the user to select the application to be activated (S224: No). On the other hand, when the MFP 10 has detected a touch operation on one of the buttons contained in the third screen 53 (S224: Yes), this flow goes to S211. As a result, the terminal 100 can activate an application corresponding to the operated button and obtain the current set value set in the MFP 10 for its function which is to be used by the activated application.

Figure 3:
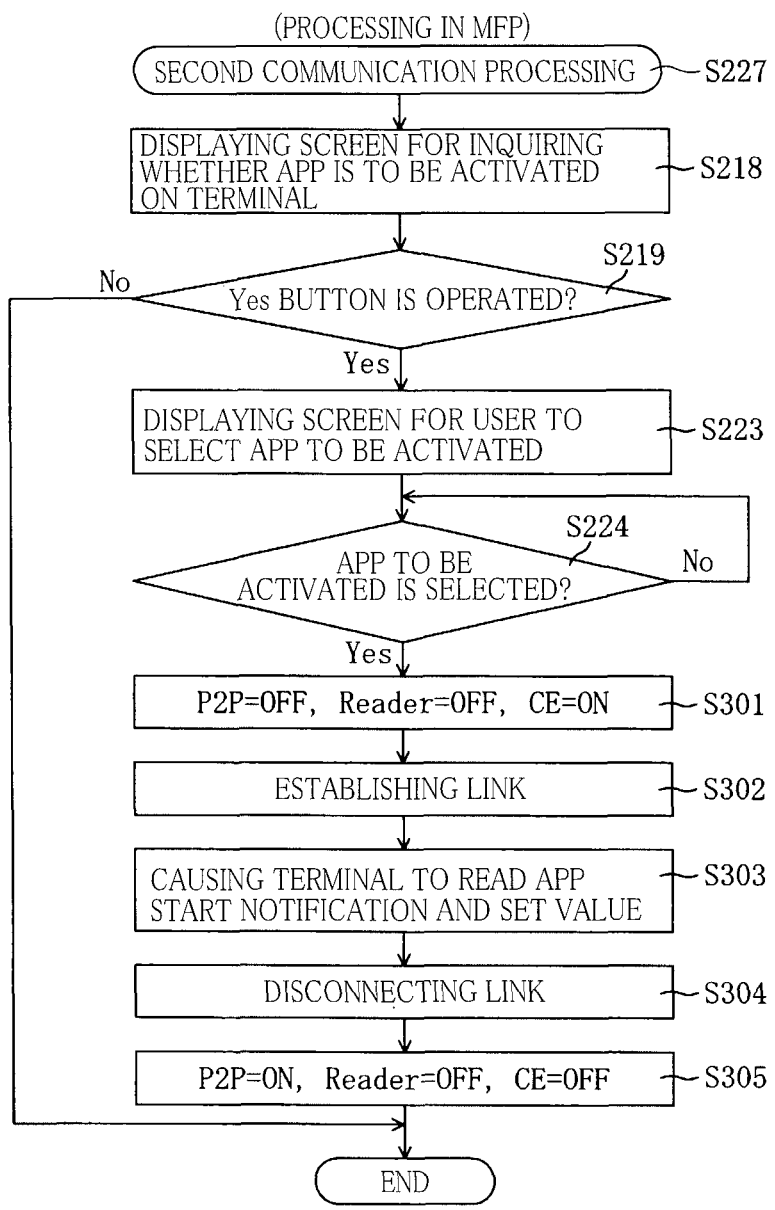
FIG. 3 is a flow chart illustrating a second communication processing.

FIG. 3 is a flow chart illustrating the second communication processing at S227. The second communication processing at S227 is executed in a case where the MFP 10 is in the P2P mode, and the terminal 100 is in the Reader mode. In a case where an application for using a certain function of the at least one function of the MFP 10 is running on the terminal 100, the terminal 100 normally is in the P2P mode. Accordingly, in the case where the terminal 100 is in the Reader mode, the application for using the certain function of the MFP 10 (in the present embodiment, the device control application 112b) is not running on the terminal 100. That is, in the present embodiment, the processing at S203 in FIG. 2 is a processing at which the CPU 11 determines whether the device control application 112b is running on the terminal 100 or not. Accordingly, the second communication processing at S227 is executed in a case where an application for using the certain function of the MFP 10 is not running on the terminal 100. It is noted that the same step numbers as used in the above-described communication processing in FIG. 2 are used to designate the corresponding processings of the second communication processing at S227, and an explanation of which is dispensed with.

Figure 5A:
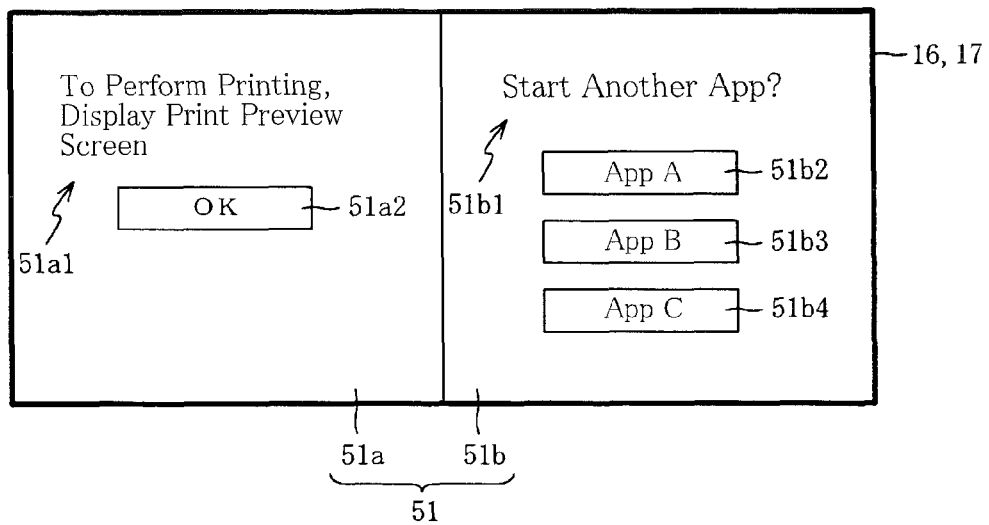
FIGS. 5A-5C are schematic views illustrating screens which are displayed on an LCD in a communication processing.
Figure 5B:
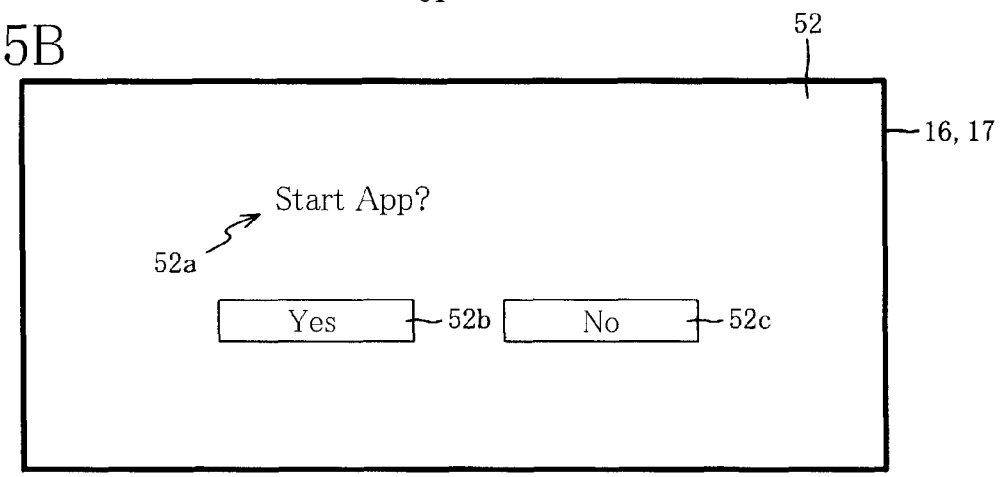

The CPU 11 at S218 controls the LCD 16 to display the second screen 52 (see FIG. 5B). When the MFP 10 has detected the touch operation on the No button 52c contained in the second screen 52 (S219: No), this processing ends. On the other hand, when the MFP 10 has detected the touch operation on the Yes button 52b contained in the second screen 52 (S219: Yes), the CPU 11 at S223 controls the LCD 16 to display the third screen 53 (see FIG. 5C). It should be understood that the third screen 53 displayed on the LCD 16 in the processing at S223 which is executed in the second communication processing at S227 contains a plurality of buttons which are selected by the user to designate the applications stored in the application table 12b (i.e., the application capable of using the function of the MFP 10). Upon completion of the processing at 223, the CPU 11 waits for the user to select an application to be activated (S224: No). On the other hand, when the MFP 10 has detected a touch operation on one of the buttons contained in the third screen 53 (S224: Yes), this flow goes to S301.

The CPU 11 at S301 activates the CE mode to change the mode of the MFP 10 to the CE mode and stops the P2P mode. After the processing at 301, the MFP 10 is in the CE mode, and the terminal 100 is in the Reader mode. Then, the CPU 11 at S302 monitors that a communication link corresponding to the CE mode and the Reader mode (hereinafter referred to as "MFP (CE)-partner (R) communication link") is established between the MFP 10 and the terminal 100.

In a case where the MFP 10 which performs the Listen operation is currently not in the P2P mode but in the CE mode, and the terminal 100 which executes the Poll operation is currently in the Reader mode or the Writer mode, the CPU 11 receives the Activation command corresponding to the R/W mode from the terminal 100. In this case, the CPU 11 determines that the MFP 10 is to operate in the CE mode, and the CPU 11 transmits an OK command to the terminal 100. As a result, a communication link corresponding to the CE mode and the R/W mode is established between the MFP 10 which performs the Listen operation and the terminal 100 which executes the Poll operation.

It is noted that, in the case where the communication link corresponding to the CE mode and the R/W mode is established, the CPU 11 further receives, from the terminal 100, information indicating whether the terminal 100 is to operate in the Reader mode or the Writer mode. Accordingly, when the CPU 11 at S302 has received information indicating that the terminal 100 is to operate in the Reader mode, the CPU 11 determines that the MFP (CE)-partner (R) communication link has been established between the MFP 10 which performs the Listen operation and the terminal 100 which executes the Poll operation.

Then, the CPU 11 at S303 controls the short-distance communication portion 22 to use the MFP (CE)-partner (R) communication link to transmit the app start notification and the set value to the terminal 100 by causing the terminal 100 to read the app start notification. As in the processing at S211, the app start notification is the application number assigned to an application corresponding to an operated one of the buttons contained in the third screen 53. As in the processing at S212, the set value is a current set value stored in the flash memory 12 for the certain function of the MFP 10 which is used by the application corresponding to the app start notification (i.e., the application number) to be transmitted to the terminal 100.

Upon completion of the processing at 303, the CPU 11 at S304 disconnects the MFP (CE)-partner (R) communication link. Specifically, the CPU 11 at S304 performs communication for a Deactivation command and an OK command. Since the terminal 100 performs the Poll operation, and the MFP 10 performs the Listen operation in execution of the processing at S304, the CPU 11 receives the Deactivation command from the terminal 100 via the short-distance communication portion 22 and controls the short-distance communication portion 22 to transmit the OK command to the terminal 100 in response to the Deactivation command. As a result, the MFP (CE)-partner (R) communication link is disconnected.

Then, the CPU 11 at S305 activates the P2P mode to change the mode of the MFP 10 to the P2P mode and stops the CE mode. After the processing at 305, the MFP 10 is in the P2P mode, and the terminal 100 is in the Reader mode. Upon completion of the processing at 305, this flow ends.

Figure 4:
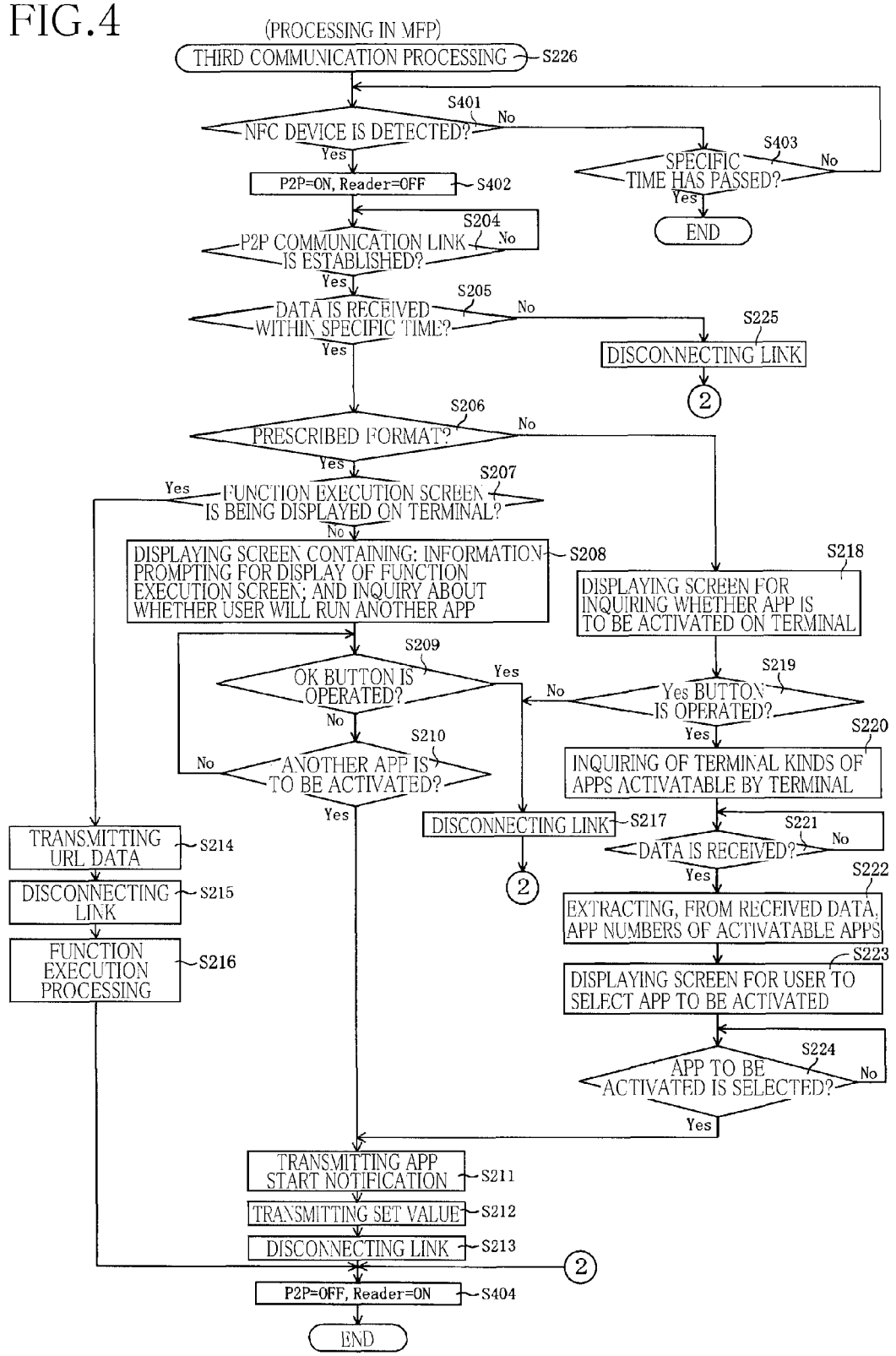
FIG. 4 is a flow chart illustrating a third communication processing.

FIG. 4 is a flow chart illustrating the third communication processing at S226. The third communication processing at S226 is executed in the case where the MFP 10 is in the Reader mode. It is noted that the same step numbers as used in the above-described communication processing in FIG. 2 are used to designate the corresponding processings of the second communication processing at S226, and an explanation of which is dispensed with.

The CPU 11 at S401 determines whether the MFP 10 has detected the terminal 100 as the NFC device or not. When the CPU 11 determines that the MFP 10 has not detected the terminal 100 (S401: No), the CPU 11 at S403 determines whether a specific length of time (e.g., five seconds) has passed or not. When the CPU 11 determines that the specific length of time has not passed (S403: No), the CPU 11 waits for the terminal 100 to be detected. When the MFP 10 has not detected the terminal 100 within the specific length of time (S403: Yes), this flow ends. In this case, it is considered that the terminal 100 is in a mode which cannot be detected by the MFP 10 in the Reader mode, for example, the terminal 100 is in the Reader mode.

When the CPU 11 at S401 determines that the MFP 10 has detected the terminal 100 within the specific length of time (S401: Yes), the CPU 11 at S402 activates the P2P mode to change the mode of the MFP 10 to the P2P mode and stops the Reader mode. Upon completion of the processing at 402, both of the MFP 10 and the terminal 100 are in the P2P mode. Accordingly, after the processing at 402, the CPU 11 executes the same processings as executed at S204-S225 in the above-described communication processing in FIG. 2. In the third communication processing at S226, however, after disconnecting the P2P communication link at S213, 5222, or 5225, the CPU 11 at S404 activates the Reader mode to change the mode of the MFP 10 to the Reader mode and stops the P2P mode, this flow ends. Also after executing the function execution processing at S216, the CPU 11 executes the processing at S404, and this flow ends. After the processing at 404, the MFP 10 is in the Reader mode.

Figure 5C:
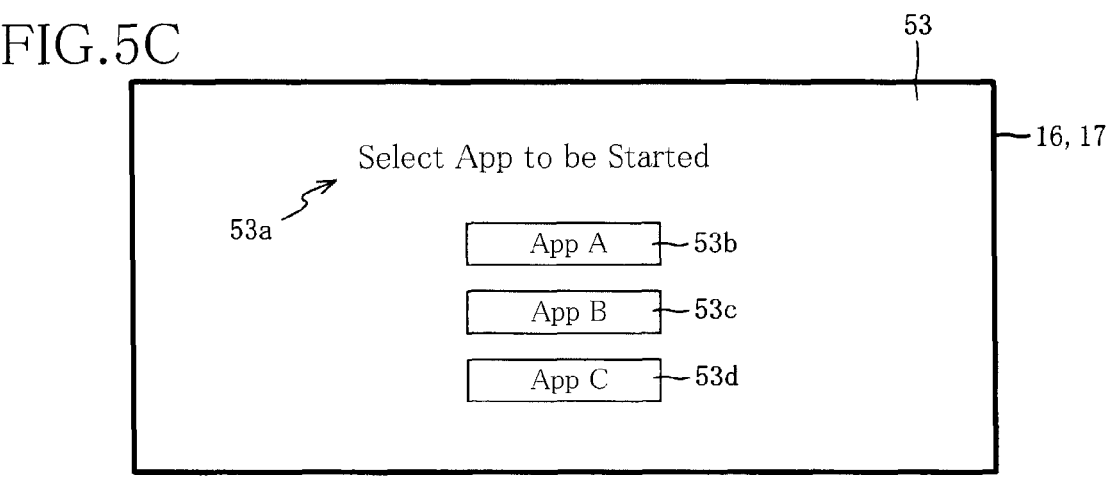

FIGS. 5A-5C are schematic views illustrating screens which are displayed on the LCD 16 in the above-described communication processings in FIGS. 2-4. Specifically, FIG. 5A is a schematic view illustrating the first screen 51. The first screen 51 is displayed by the CPU 11 at S208 in the above-described communication processings in FIGS. 2 and 4. A left portion of the first screen 51 contains information 51a prompting for display of the function execution screen, and a right portion of the first screen 51 contains an inquiry 51b about whether the user will activate another application or not.

The information 51a contains: a message 51a1 prompting for display of the function execution screen (e.g., the print preview screen); and the OK button 51a2 which is displayed for the user to confirm recognition of the information 51a. When the touch panel 17 has detected a touch operation of the user on the OK button 51a2, the CPU 11 executes the processing at S217 in FIGS. 2 and 4.

The inquiry 51b contains: a message 51b1 for inquiring of the user whether or not the user will activate an application that differs from the application currently running; and a plurality of buttons 51b2-51b4 respectively corresponding to applications which the user can designate. In the present embodiment, the buttons 51b2-51b4 respectively correspond to applications different from the application currently running among the applications stored in the application table 12b (i.e., the application capable of using the at least one function of the MFP 10). It is noted that the number of the buttons 51b2-51b4 changes according to the number of applications which the user can designate. When the touch panel 17 has detected a touch operation of the user on any of the buttons 51b2-51b4, the CPU 11 executes the processing at S211 in FIGS. 2 and 4.

FIG. 5B is a schematic view illustrating the second screen 52. The second screen 52 is displayed by the CPU 11 at S218 in the communication processings in FIGS. 2 and 4. The second screen 52 is a screen for inquiring of the user whether the user will activate an application or not. The second screen 52 contains: a message 52a inquiring of the user whether the user will activate the application or not; the Yes button 52b displayed for the user to show his or her intention of activating the application; and the No button 52c displayed for the user to show his or her intention of not activating the application. When the touch panel 17 has detected a touch operation of the user on the Yes button 52b, the CPU 11 executes the processing at S220 in FIGS. 2 and 4. On the other hand, when the touch panel 17 has detected a touch operation of the user on the No button 52c, the CPU 11 executes the processing at S217 in FIGS. 2 and 4.

FIG. 5C is a schematic view illustrating the third screen 53. The third screen 53 is a screen which is displayed at S223 in FIGS. 2-4 for the user to select an application to be activated. The third screen 53 contains a message 53a for inquiring of the user which application the user will activate; and a plurality of buttons 53b-53d respectively corresponding to applications which the user can designate. In the present embodiment, the buttons 53b-53d respectively correspond to the application extracted at S222 or the applications stored in the application table 12b. It is noted that the number of the buttons 53b-53d changes according to the number of applications which the user can designate. When the touch panel 17 has detected a touch operation of the user on any of the buttons 53b-53d, the CPU 11 executes the processing at S211 in FIGS. 2 and 4 or at S301 in FIG. 3.

The MFP 10 according to the present embodiment determines whether the application capable of using the certain function of the MFP 10 is running or not on the terminal 100 as a communication partner in the NFC communication. Accordingly, it is possible to determine whether a specific application, specifically, the application capable of using the certain function of the MFP 10, is running on the terminal 100 or not regardless of the type of the terminal 100. When the MFP 10 determines that the application capable of using the certain function of the MFP 10 is running on the terminal 100, the certain function related to the running application is executed. On the other hand, when the MFP 10 determines that the application capable of using the certain function of the MFP 10 is not running on the terminal 100, the MFP 10 can send the terminal 100 the app start notification for activating a specific application desired by the user, to activate the application corresponding to the app start notification on the terminal 100. Therefore, the MFP 10 can execute appropriate control according to a running state of a specific application on the terminal 100.

When the application capable of using the certain function of the MFP 10 is not running on the terminal 100, the MFP 10 displays a screen (e.g., the second screen 52 and the third screen 53) for inquiring of the user whether the user will activate an application or not and which application the user will activate, making it possible to activate an application desired by the user on the terminal 100. The third screen 53 contains the buttons 53b-53d displayed for the user to designate applications after the MFP 10 inquires of the terminal 100 which applications can be activated on the terminal 100. Accordingly, the user can select an application activatable on the terminal 100, and it is possible to prevent an occurrence of a situation in which the selected application is not activated.

When the function execution screen is not being displayed on the LCD 116 of the terminal 100 though the MFP 10 determines that the application capable of using the certain function of the MFP 10 is running on the terminal 100, the LCD 16 displays the information 51a (i.e., a portion of the first screen 51) for prompting for display of the function execution screen. In the present embodiment, the terminal 100 can use the certain function of the MFP 10 on condition that the function execution screen is being displayed on the LCD 116. Thus, even in the case where the application capable of using the certain function of the MFP 10 is running on the terminal 100, when the function execution screen is not being displayed on the LCD 116 of the terminal 100, the terminal 100 cannot use the certain function of the MFP 10. The information 51a is displayed on the LCD 16 in this case, thereby prompting the user to display the function execution screen and use the application running on the terminal 100 to cause the MFP 10 to execute the certain function.

When the function execution screen is not being displayed on the LCD 116 of the terminal 100 though the MFP 10 determines that the application capable of using the certain function of the MFP 10 is running on the terminal 100, the LCD 16 displays the inquiry 51b (i.e., a portion of the first screen 51) for inquiring whether the user will activate another application or not. In the case where the function execution screen is not being displayed on the LCD 116 of the terminal 100, the user may have little intention of executing the certain function of the running application. For example, there is a possibility that the user has activated an application different from a desired one. Since the inquiry 51b is displayed on the LCD 16 in this case, the user can activate another application, e.g., the application desired by the user, before the certain function not desired by the user is executed.

In the case where the terminal 100 is in a mode in which the terminal 100 cannot receive data from the MFP 10, with respect to a mode of the MFP 10 according to the NFC standard, the MFP 10 according to the present embodiment changes its mode to allow the terminal 100 to receive the app start notification. Accordingly, the MFP 10 can execute appropriate control according to a running state of a specific application on the terminal 100, not depending upon the modes of the MFP 10 and the terminal 100.

In the above-described embodiment, the MFP 10 is one example of a function executing apparatus. The terminal 100 is one example of an external device. The short-distance communication portion 22 is one example of a communication device. The printer 19 is one example of a function executing device and a printing device. The CPU 11 is one example of a controller. The LCD 16 is one example of a display device. The flash memory 12 is one example of a storage. The touch panel 17 is one example of a receiver. The device control application 112b is one example of an application program corresponding to a preset function. The function execution screen is one example of a predetermined screen. Each of the second screen 52 and the third screen 53 is one example of a first inquiry screen. The third screen 53 is one example of a second inquiry screen. The information 51a is one example of a screen for prompting for display of a screen for commanding a start of execution of at least one preset function. The inquiry 51b is one example of a third inquiry screen for inquiring whether an application program that differs from an application program that is determined to be running is to be activated. The P2P mode is one example of a first mode. The Reader mode is one example of a second mode. The CE mode is one example of a third mode. The CPU 11 which executes the processings at S202 and S401 is one example of a communication determination processing. The CPU 11 which executes the processings at S203 and 5206 is one example of a running-state determination processing. The CPU 11 which executes the processing at S216 is one example of a function control processing. The CPU 11 which executes the processings at S211 and 5303 is one example of an activation command processing. The CPU 11 which executes the processings at S218 and 5223 is one example of a first display control processing. The CPU 11 which executes the processing at S223 is one example of a second display control processing. The CPU 11 which executes the processing at S220 is one example of an inquiry processing. The CPU 11 which executes the processing at S208 is one example of a third display control processing and a fourth display control processing. The CPU 11 which executes the processing at S207 is one example of a screen determination processing. The CPU 11 which executes the processing at S203 is one example of a mode determination processing. The CPU 11 which executes the processing at S301 is one example of a mode switch processing. The CPU 11 which executes the processing at S402 is one example of a second mode switch processing. The CPU 11 which executes the processings at S212 and S303 is one example of a set value transmitting processing.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

For example, while the MFP 10 is one example of the function executing apparatus according to the present invention in the above-described embodiment, the function executing apparatus according to the present invention is not limited to the MFP 10 having a plurality of functions. That is, any device may be employed as the function executing apparatus according to the present invention as long as the device can execute at least one function. Examples of the function executing apparatus include: a device having only one function such as a printer and a scanner; and a personal computer having a storage function.

While the printing function is one example of the at least one function of the MFP 10 which are used by the terminal 100 as the NFC device in the above-described embodiment, the present invention may be applied to a configuration in which the NFC device such as the terminal 100 uses a function different from the printing function. Examples of configurations to which the present invention is applicable include: a configuration in which image data and document data stored in the terminal 100 are transmitted using the facsimile function of the MFP 10; a configuration in which data stored in the terminal 100 is stored into the MFP 10; a configuration in which data stored in the terminal 100 is stored into a cloud server, not shown, on the internet via the MFP 10. Also, the present invention may be applied to a configuration in which scan data obtained using the scanning function of the MFP 10 is stored into a terminal. That is, the MFP 10 may be configured to: judge a running state of each application which allows the NFC device to use a function executable by the MFP 10; and to execute a processing related to a result of the judgment.

While both of the NFC communication and the Wi-Fi communication are available between the MFP 10 and the terminal 100 in the above-described embodiment, the present invention is applicable to any configuration as long as at least the NFC communication can be used between the MFP 10 and the terminal 100. Also, while the MFP 10 downloads data uploaded by the terminal 100 to the internet server and uses the downloaded data to execute the function in the above-described embodiment, data to be processed may be transmitted from the terminal 100 to the MFP 10 over the Wi-Fi communication in the ad hoc mode. Alternatively, the data to be processed may be transmitted over other types of wireless communication such as Bluetooth® communication.

While the contactless communication according to the NFC standard (i.e., the NFC communication) is used as the short-distance wireless communication in the above-described embodiment, contactless communication according to other standards such as TransferJet™ may be used. Instead of the NFC communication, the data received at S205, i.e., the data in the prescribed format may be transferred over other types of wireless communication such as the Wi-Fi communication.

While the terminal 100 such as the smartphone is employed as an external device which uses the functions executable by the MFP 10 in the above-described embodiment, the present invention is not limited to this configuration. That is, various devices can be employed as the external device as long as the devices can perform the NFC communication. For example, in a case where devices such as a tablet device, a personal computer, a digital camera, and a music player can perform the NFC communication, these devices may be employed as the external device which uses the functions executable by the MFP 10. While the OS 112*a* of the terminal 100 is the Andriod OS in the above-described embodiment, other OSs may be employed.

While the first screen 51 contains the information 51*a* and the inquiry 51*b* in the above-described embodiment, the first screen 51 may contain only one of the information 51*a* and the inquiry 51*b*. In a case where this configuration is employed, the above-described flows omit one of processings at S209 and 5210 which corresponds to display of an omitted one of the information 51*a* and the inquiry 51*b*. Also, in the above-described embodiment, in the case where the received data is not in the prescribed format, the MFP 10 inquires of the terminal 100 kinds of applications activatable by the terminal 100, but the MFP 10 may not make this inquiry. In this configuration, the third screen 53 only needs to contain buttons displayed for the user to designate the applications stored in the application table 12*b*, each as a button displayed for the user to designate an application. Also, in the above-described embodiment, the MFP 10 displays the second screen 52 for inquiring of the user whether the user will activate an application or not and then displays the third screen 53, but the second screen 52 may not be displayed. In this configuration, the third screen 53 functions not only as a screen displayed for the user to select an application to be activated but also a screen for inquiring of the user whether the user will activate an application or not.

In the above-described embodiment, the touch panel 17 detects touch operations on the buttons 51*a*2 and 51*b*2-51*b*4 displayed on the first screen 51, the buttons 52*b*, 52*c* displayed on the second screen 52, and the buttons 53*b*-53*d* displayed on the third screen 53. However, the operation keys 15 may be operated for selection and confirmation of a desired button. In this configuration, the operation keys 15 are one example of the receiver.

While the CPU 11 executes each processing in FIGS. 2-4 in the above-described embodiment and the modifications, each processing in FIGS. 2-4 may be executed by a plurality of CPUs in combination. Also, each processing in FIGS. 2-4 may be executed by a single or a plurality of ICs such as ASICs. Also, each processing in FIGS. 2-4 may be executed by the CPU(s) 11 and the IC(s) such as ASIC(s) in combination.

What is claimed is:

1. A function executing apparatus comprising:
a communication device configured to communicate with an external device;
a function executing device configured to execute at least one preset function;
a processor; and
a memory configured to store instructions which, when executed by the processor, cause the function executing device to:
determine whether communication of the communication device with the external device is possible;
execute a running-state determination processing in which the processor determines whether an application program corresponding to a certain function of the at least one preset function to be executed by the function executing device is running on the external device, when the processor determines that the communication of the communication device with the external device is possible;
control the function executing device to execute the certain function, when the processor in the running-state determination processing determines that the application program corresponding to the certain function is running; and
execute an activation command processing in which the processor transmits an activation command for activating the application program corresponding to the certain function, to the external device, when the processor in the running-state determination processing determines that the application program corresponding to the certain function is not running.

2. The function executing apparatus according to claim 1, further comprising:
a display device; and
a receiver configured to receive a command of a user,
wherein the instructions, when executed by the processor, cause the function executing device to:
control the display device to display a screen for activating the application program corresponding to the certain function, when the processor in the running-state determination processing determines that the application program corresponding to the certain function of the at least one preset function is not running; and
transmit the activation command to the external device in the activation command processing when a command for activating the application program corresponding to the certain function is received.

3. The function executing apparatus according to claim 1, further comprising:
a display device; and
a receiver configured to receive a command of a user,
wherein the instructions, when executed by the processor, cause the function executing device to:

control the display device to display a first inquiry screen for inquiring whether the application program is to be activated, when the processor in the running-state determination processing determines that the application program corresponding to the certain function of the at least one preset function is not running; and transmit the activation command to the external device in the activation command processing when the first inquiry screen is displayed and when a command for activating the application program is received by the receiver.

4. The function executing apparatus according to claim 1, further comprising:

a display device; and a receiver configured to receive a command of a user, wherein the instructions, when executed by the processor, cause the function executing device to:

control the display device to display a second inquiry screen for identifying a type of an application program to be activated by the external device, when the processor in the running-state determination processing determines that the application program corresponding to the certain function of the at least one preset function is not running; and when the second inquiry screen is displayed and when a command of identifying the type of the application program to be activated by the external device is received by the receiver, transmit a command for activating the application program of the identified type, to the external device in the activation command processing.

5. The function executing apparatus according to claim 4, wherein the instructions, when executed by the processor, cause the function executing device to:

execute an inquiry processing in which the processor inquires of the external device an application program activatable by the external device, when the processor in the running-state determination processing determines that the application program corresponding to the certain function of the at least one preset function is not running; and control the display device to display the second inquiry screen based on a response to the inquiry processing which is transmitted from the external device.

6. The function executing apparatus according to claim 5, wherein the response to the inquiry processing which is transmitted from the external device comprises information identifying at least one application program executable by the external device, and wherein the second inquiry screen comprises a display for identifying the application program corresponding to the certain function among the at least one application program executable by the external device.

7. The function executing apparatus according to claim 1, further comprising:

a display device; and a receiver configured to receive a command of a user, wherein the instructions, when executed by the processor, cause the function executing device to:

based on information which is capable of identifying a screen being displayed on the external device and which is received by the communication device from the external device, determine whether the screen being displayed on the external device is a screen for commanding a start of execution of the certain function of the at least one preset function;

control the function executing device to execute the certain function related to the application program that is determined to be running, when the processor in the running-state determination processing determines that the application program corresponding to the certain function is running and where the screen being displayed on the external device is the screen for commanding the start of execution of the certain function among a plurality of screens corresponding to a function related to the application program that is determined to be running; and control the display device to display a screen for prompting for display of the screen for commanding the start of execution of the certain function, when the processor in the running-state determination processing determines that the application program corresponding to the certain function is running and where the screen being displayed on the external device is not the screen for commanding the start of execution of the certain function among the plurality of screens corresponding to the function related to the application program that is determined to be running.

8. The function executing apparatus according to claim 1, further comprising:

a display device; and a receiver configured to receive a command of a user, wherein the instructions, when executed by the processor, cause the function executing device to:

based on information which is capable of identifying a screen being displayed on the external device and which is received by the communication device from the external device, determine whether the screen being displayed on the external device is a screen for commanding a start of execution of the certain function of the at least one preset function;

control the function executing device to execute the certain function related to the application program that is determined to be running, when the processor in the running-state determination processing determines that the application program corresponding to the certain function is running and where the screen being displayed on the external device is the screen for commanding the start of execution of the certain function among a plurality of screens corresponding to a function related to the application program that is determined to be running;

control the display device to display a third inquiry screen for inquiring whether an application program that differs from the application program that is determined to be running is to be activated, when the processor in the running-state determination processing determines that the application program corresponding to the certain function is running and where the screen being displayed on the external device is not the screen for commanding the start of execution of the certain function among the plurality of screens corresponding to the function related to the application program that is determined to be running; and transmit an activation command for activating the application program that differs from the application program that is determined to be running, to the external device in the activation command processing when the third inquiry screen is displayed and when a command for activating the application program that differs from the application program that is determined to be running is received by the receiver.

9. The function executing apparatus according to claim 1,
wherein the communication device is configured to communicate with the external device over short-distance wireless communication,
wherein a mode of the short-distance wireless communication comprises a first mode, a second mode, and a third mode, wherein the first mode is a mode for performing two-way communication with a partner device, and the second mode is a mode for performing one-way communication to read data from a device being in the third mode, and
wherein the instructions, when executed by the processor, cause the function executing device to:
   determine whether the communication device is in communication with the external device over the short-distance wireless communication has become possible;
   identify a mode of the external device as the mode of the short-distance wireless communication when the processor determines that the communication device is in communication with the external device over the short-distance wireless communication in a state in which the function executing apparatus is in the first mode as the mode of the short-distance wireless communication;
   switch the mode of the function executing apparatus from the first mode to the third mode as the mode of the short-distance wireless communication when the external device is not in the first mode but in the second mode for reading data from a device being in the third mode; and
   in a state in which the function executing apparatus is in the third mode switched from the first mode, set the activation command as data to be read by the external device and cause the external device being in the second mode to read the activation command.

10. The function executing apparatus according to claim 9,
wherein the short-distance wireless communication is wireless communication according to an NFC (Near Field Communication) standard,
wherein the first mode is a P2P (Peer to Peer) mode according to the NFC standard,
wherein the second mode is a Reader mode according to the NFC standard, and
wherein the third mode is a CE (Card Emulation) mode according to the NFC standard.

11. The function executing apparatus according to claim 1,
wherein the communication device is in communication with the external device over short-distance wireless communication,
wherein a mode of the short-distance wireless communication comprises: a first mode for performing two-way communication with a partner device; a second mode for performing one-way communication to read data from a device being in a third mode; and the third mode, and
wherein the instructions, when executed by the processor, cause the function executing device to:
   switch the mode of the function executing apparatus as the mode of the short-distance wireless communication from the second mode to the first mode when the external device is in the first mode as the mode of the short-distance wireless communication and when the function executing apparatus is in the second mode as the mode of the short-distance wireless communication; and
   set the activation command as data to be read by the external device and transmit the activation command to the external device in a state in which the function executing apparatus is in the first mode as the mode of the short-distance wireless communication, when the processor in the running-state determination processing determines that the application program corresponding to the certain function of the at least one preset function is not running.

12. The function executing apparatus according to claim 1,
wherein the memory is configured to store a set value used for the function executing device to execute the at least one preset function, and
wherein the instructions, when executed by the processor, cause the function executing device to transmit, to the external device, a set value for a function corresponding to an application program to be activated in response to the activation command, when the activation command is transmitted in the activation command processing.

13. The function executing apparatus according to claim 1, wherein the function executing device is a printing device configured to perform, as the certain function of the at least one preset function, printing of an image on a recording medium based on print data.

14. A non-transitory storage medium storing instructions readable and executable by a function executing apparatus, the function executing apparatus comprising:
   a communication device configured to communicate with an external device;
   a processor; and
   a function executing device configured to execute at least one preset function;
   the instructions, when executed by the processor, causing the function executing device to:
      determine whether communication of the communication device with the external device is possible;
      execute a running-state determination processing in which the processor determines whether an application program corresponding to a certain function of the at least one preset function to be executed by the function executing device is running on the external device, when the processor determines that the communication of the communication device with the external device is possible;
      control the function executing device to execute the certain function, when the processor in the running-state determination processing determines that the application program corresponding to the certain function is running; and
      execute an activation command processing in which the processor transmits an activation command for activating the application program corresponding to the certain function, to the external device, when the processor in the running-state determination processing determines that the application program corresponding to the certain function is not running.

15. A method of controlling a function executing apparatus, the function executing apparatus comprising:
   a communication device configured to communicate with an external device;
   a function executing device configured to execute at least one preset function; and
   a processor;
   the method causing the function executing device to:
      determine whether communication of the communication device with the external device is possible;
      execute a running-state determination processing in which the processor determines whether an application program corresponding to a certain function of the at least one preset function to be executed by the function executing device is running on the external device, when the processor determines that the communication of the communication device with the external device is possible;
control the function executing device to execute the certain function, when the processor in the running-state determination processing determines that the application program corresponding to the certain function is running; and
execute an activation command processing in which the processor transmits an activation command for activating the application program corresponding to the certain function, to the external device, when the processor in the running-state determination processing determines that the application program corresponding to the certain function is not running.

* * * * *